(12) United States Patent
McDouall

(10) Patent No.: US 10,521,840 B2
(45) Date of Patent: Dec. 31, 2019

(54) VIRTUAL INTERACTIVE MARKETPLACE

(71) Applicant: LOR TECHNOLOGIES (PTY) LTD, Edenvale (ZA)

(72) Inventor: Francis John Stephen McDouall, Randburg (ZA)

(73) Assignee: LOR TECHNOLOGIES (PTY) LTD, Edenvale (SA)

( * ) Notice: Subject to any disclaimer, the term of this patent is extended or adjusted under 35 U.S.C. 154(b) by 622 days.

(21) Appl. No.: 15/102,960

(22) PCT Filed: Dec. 5, 2014

(86) PCT No.: PCT/ZA2014/000070
§ 371 (c)(1),
(2) Date: Jun. 9, 2016

(87) PCT Pub. No.: WO2015/089523
PCT Pub. Date: Jun. 18, 2015

(65) Prior Publication Data
US 2016/0307250 A1    Oct. 20, 2016

(30) Foreign Application Priority Data

Dec. 9, 2013   (ZA) .................................. 2013/09237

(51) Int. Cl.
*G06Q 30/00* (2012.01)
*G06Q 30/06* (2012.01)
(Continued)

(52) U.S. Cl.
CPC ..... *G06Q 30/0613* (2013.01); *G06Q 30/0601* (2013.01); *G06Q 40/12* (2013.12); *H04L 67/02* (2013.01)

(58) Field of Classification Search
CPC ...... G06Q 40/12; G06Q 30/0601–0645; H04L 67/02
See application file for complete search history.

(56) References Cited

U.S. PATENT DOCUMENTS 6,195,091 B1    2/2001  Harple et al.
6,349,337 B1 *  2/2002  Parsons, Jr. ............. H04L 29/06
                                                    709/227
(Continued)

FOREIGN PATENT DOCUMENTS

WO     WO 01/69425       9/2001

OTHER PUBLICATIONS

Elmorshidy, Ahmed, Mar./Apr. 2013, Applying the Technology Acceptance and Service Quality Models to Live Customer Support Chat for E-Commerce Websites, The Journal of Applied Business Research, vol. 29, No. 2, pp. 589-595 (Year: 2013).*

*Primary Examiner* — Marissa Thein
*Assistant Examiner* — Maria S. P. Heath
(74) *Attorney, Agent, or Firm* — Cesari and McKenna, LLP

(57) ABSTRACT

The invention provides an interactive web based market place and a system for providing a web based market place. The web based market place includes a website. The market place is configured to: display products together with information regarding the respective products, which can be searched and viewed by a potential customer; monitor potential customer activity viewing a particular product; monitor online status of the seller of the particular product; provide the opportunity for the seller to initiate contact, via a portal, with the potential customer whilst the potential customer is viewing the seller's product on the web based market place by means of a live chat mechanism; and providing the means for the customer to interact live with the seller on the website.

20 Claims, 24 Drawing Sheets

(51) Int. Cl.
*G06Q 40/00* (2012.01)
*H04L 29/08* (2006.01)

(56) References Cited

U.S. PATENT DOCUMENTS

| | | | |
|---|---|---|---|
| 7,761,507 B2* | 7/2010 | Herf | H04L 12/1822 |
| | | | 709/204 |
| 2008/0065726 A1* | 3/2008 | Schoenberg | G06Q 10/06375 |
| | | | 709/205 |
| 2009/0265245 A1* | 10/2009 | Wright | G06Q 30/02 |
| | | | 705/14.66 |
| 2010/0030578 A1 | 2/2010 | Siddique et al. | |
| 2010/0161635 A1 | 6/2010 | Dey | |
| 2013/0275862 A1* | 10/2013 | Adra | H04L 51/04 |
| | | | 715/234 |

\* cited by examiner

FIG. 1

User maintenance
< Back · Help · Print

| Email | Password | Firstname | Surname | Cell | Office | | | | |
|---|---|---|---|---|---|---|---|---|---|
| frank@carltd.co.za | 12cars3dcars | Frank | McDouall | 084 2626252 | 011 5615808 | Groups | Dealers | Regions | Chat dealers |
| mike@carltd.co.za | 12.0d | Mike | de Charmoy | 081 9380275 | 011 5615808 | Groups | Dealers | Regions | Chat dealers |
| rick@fuzzylogic.co.za | xxx | Rick | de Villiers | 082 9092950 | 021 7614781 | Groups | Dealers | Regions | Chat dealers |

Add new item

FIG. 2

User access assignment
< Back · Help · Print

Mike de Charmoy

Search: [_____] clear

NTT Nissan Klerksdorp

FIG. 3

User access assignment
< Back · Help · Print

Frank McDouall

Search: [_____] clear

Brits Nissan
NTT Nissan Klerksdorp
NTT Nissan Potchefstroom

FIG. 34

Thank you
You chat session has completed.

Would you like to receive a copy of this chat via email?: ◯ Yes ◯ No

Also, please let us know about your experience:

Was the sales facilitator helpful?:

◯ Yes ◯ No

Was the chat process useful in any way?:

◯ Yes ◯ No

Comments/Suggestions:

Submit

FIG. 39
FIG. 40
FIG. 41
Home Loans - How much will my bond cost me monthly?
Work out your monthly bond repayment amount (instalment) based on your loan amount, interest rate and term. The instalment amount does not include insurance and other monthly charges.
* Purchase price:
* Total deposit:

FIG. 44

Dear Johnathan
Below is a copy of the chat you had earlier with Frank McDouall.
Contact details for Frank:

Email: frank@carfind.co.za

Work: 011 5618600

Cell: 084 2525252

Vehicle details:

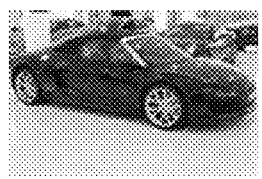
Audi - R8 Spyder 4.2 FSi (316 kW) Quattro S-tronic
2014 - R 1,899,990
2563 km Navigation System
Park Plus with Reverse Camera
19" Alloy Wheels
Bluetooth
Cruise Control
Multifunction Steering
Climate Control
Park Distance Control (PDC) - Front and Rear
Custom Leather Interior
Folding Mirror with Heating
Aluminium Pedals Chat transcript:

Frank:
Hi There, how can I be of assistance to you?

Me:
Hi Frank, I would like to know if this vehicle is available to view and also what service plan time period this vehicle has?

Frank:
This vehicle is available to view. When would you like to come in and view the vehicle?

Frank:
The service plan time period on this vehicle is 7 years

Me:
Thanks Frank, Please send me your physical address where I can view the vehicle.

Frank:
It is 155 Pritchard Street in Craighall.

Me:
Thanks, I will come in tomorrow to view the vehicle at around 10 in the morning.

Frank:
Great Johnathan, I will be hear, just ask for me at reception when you get here tomorrow, see you then

VIRTUAL INTERACTIVE MARKETPLACE

CROSS REFERENCE TO RELATED APPLICATIONS

This application is the National Stage of International Application No. PCT/ZA2014/000070, filed on Dec. 5, 2014, which claims priority to South African Application No. 2013/09237, filed on Dec. 9, 2013. The contents of both applications are hereby incorporated by reference in their entirety.

TECHNICAL FIELD OF THE INVENTION

This invention relates to an interactive web based market place.

BACKGROUND TO THE INVENTION

The inventor is aware of web based markets at which sellers of products display and offer their products for sale on the web based market. A customer will then browse the website, sort, and search or filter the products, select and read information about the products and if the customer wishes to buy a product the transaction will be concluded. The transaction is initiated by a potential customer who makes first contact with the seller typically by email or telephone.

However, the customer or potential customer only has access to the information and pictures provided on the website and needs to obtain further information in other ways should the customer have any queries regarding a particular product. However, in some cases generic information is often not sufficient for a customer to make up their minds. On some web based marketplaces a customer can raise a query to try and contact the seller or to obtain further information. However, such queries are queued and there is an inevitable delay to contact the seller and to obtain the further information or to make contact with the seller.

It is an objective of the invention to provide an improved web based marketplace.

GENERAL DESCRIPTION OF THE INVENTION

According to the invention there is provided a web based market place, which includes a website, which is configured to:

display products together with information regarding the respective products, which can be searched and viewed by a potential customer;

monitor potential customer activity viewing a particular product;

monitor online status of the seller of the particular product;

provide the opportunity, via a portal, for the seller to initiate contact with the potential customer whilst the potential customer is viewing the seller's product on the web based market place by means of a live chat mechanism; and providing the means for the customer to interact live with the seller on the website whilst looking at the seller's product.

Live chat will be understood to mean opening a communication channel to allow a potential customer to communicate in real time with the seller using voice, text, and/or video. The communication channel may preferably be online via the internet. Forms, documents and digital photos may also be uploaded via and during the live chat.

A web based marketplace will be understood to mean a website configured to display products by one or more sellers or on behalf of one or more sellers.

Products will be understood to also include services.

A portal will be understood to be any web based access page, which may be accessed by a person and may not necessarily require login.

A seller may be the owner of the product on offer for sale or a representative of the owner, such as a dealership. The seller may have a number of representatives in a chat room format to deal with queries. This may be particularly useful for online shopping in which a large variety of products or services are displayed by one seller. It will be appreciated that the market place may display goods of multiple sellers.

The portal may be an application or software on a personal computer, laptop or handheld device and the like connected to the internet to allow the seller to communicate via the live chat.

The portal or application on a personal computer, laptop or handheld device or the like may be configured to allow the seller to upload particulars of a product, including photographs and/or documentation such as a service history.

More than one portal may be activated by the seller by logging in to the marketplace with a second or further device to open a second portal, in parallel with the first portal. It will be appreciated that the seller who normally operates from a desktop pc or laptop pc can use his smartphone to log in to open a second portal and use his smartphone to continue the chat and take a picture of a part as requested by the potential customer, such as the tyres to show tyre wear, and then upload the picture. The seller can then return to his pc and continue the chat or conclude a deal.

The marketplace may be configured to list and display all the customer activity in real time such as item or information viewed and time spent by the potential customer to the seller regarding a product or products listed by the seller. This can indicate the level of interest.

The live chat mechanism or functionality may be automatically activated provided certain criteria is met such as a certain time spent by the potential customer at the product and the product details, or at the request of the seller. The customer cannot make live contact unless the seller made himself available. The seller may indicate that he is available for a chat and the website may preferably then indicate to the potential customer that the seller is online and available to communicate. The potential customer can then choose to engage with the seller.

The marketplace may be configured to have more than one representative allocated to a product, typically where the seller is a dealership or a group of dealerships. A queuing system may be provided to use another allocated representative should the first representative not be available to engage with the potential customer or if the customer numbers require more seller representatives.

The marketplace may preferably be configured to keep a log of the website activity, including chats, for each product hosted by a seller, time spent by a seller or representative on live chats etc. and may further be configured to compile an activity report and the calculation of revenue to be paid to the host of the web based marketplace. The time spent by sellers and representatives may further be used by an employee of the seller or representative to indicate sales efforts.

The invention also extends to a system for providing a web based marketplace, which system includes a server hosting a website as described above (web based software).

The system may also include a software application which can be loaded onto personal computers, laptops handheld devices and the like to provide a seller with an interface to communicate live with a potential customer.

It will be appreciated that, as opposed to a mere detached browsing, the invention allows for a true interaction between a potential customer and a seller, simulating customer/seller interaction behaviour as it would take place in an actual showroom or market place. In addition, the seller can track potential customer activity. In addition, employees of sellers and representatives can monitor the productivity of their employees. It is also important to note that interaction with the seller is available to a potential customer without the need for the potential customer to provide any personal details beyond his first name of himself and there is no need for the potential customer to create a web account, which may be a deterrent.

BRIEF DESCRIPTION OF THE DRAWINGS

FIGS. 1-3 show screen shots of product sets of sellers.
FIGS. 34-36 show the options when ending a chat session.
FIGS. 39 and 40 show screen shots of potential customer browsing products of different sellers.
FIGS. 41-42 show a customer using a home loan calculator tool.
FIG. 43 shows a screen shot showing a bond originator being available to chat.
FIG. 44 shows an email to the customer regarding the chat transcript.

DETAILED DESCRIPTION OF THE INVENTION

Figure 4:
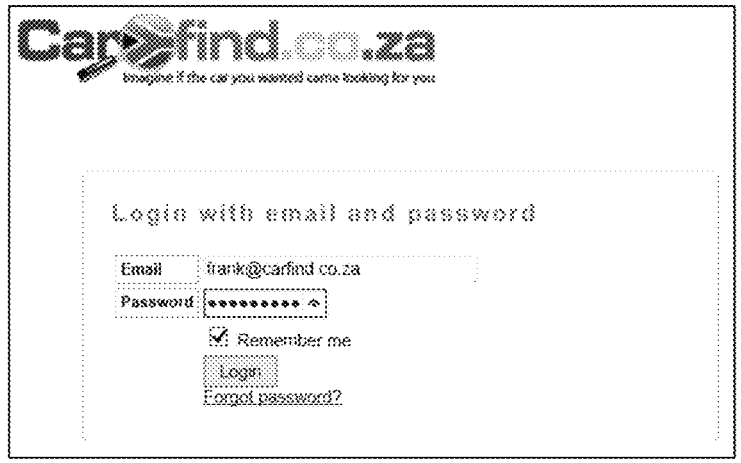
FIGS. 4-5 show login screens of a seller.
Figure 5:
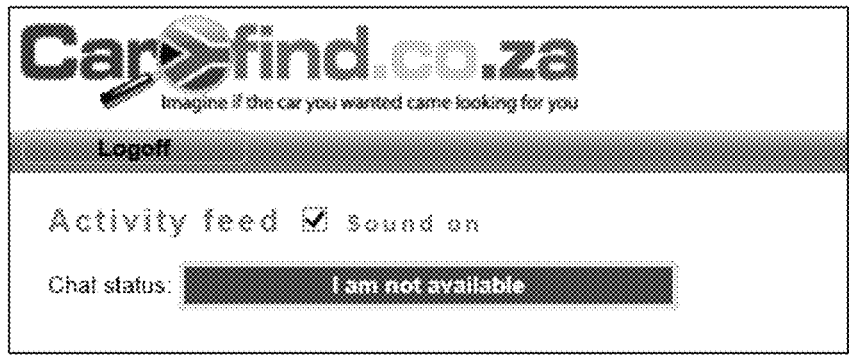
Figure 6:
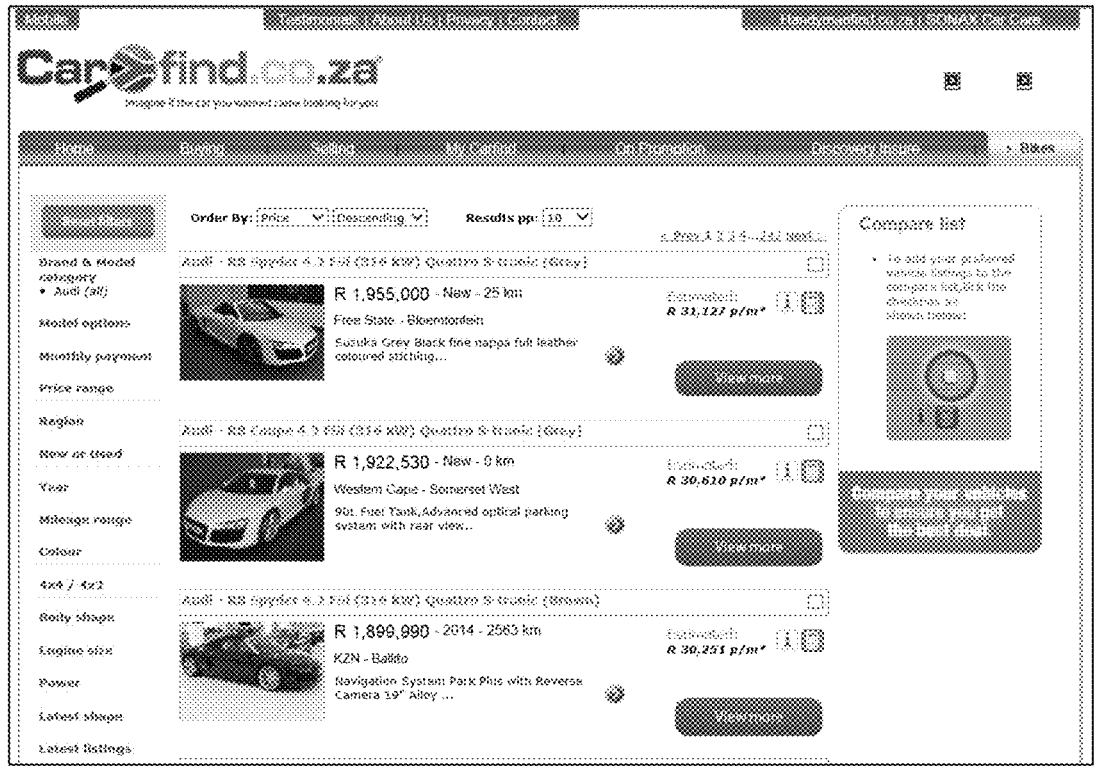
FIG. 6 shows a screen shot of a potential customer browsing products of different sellers.
Figure 7:
FIG. 7 shows a customer selecting a specific vehicle.
Figure 8:
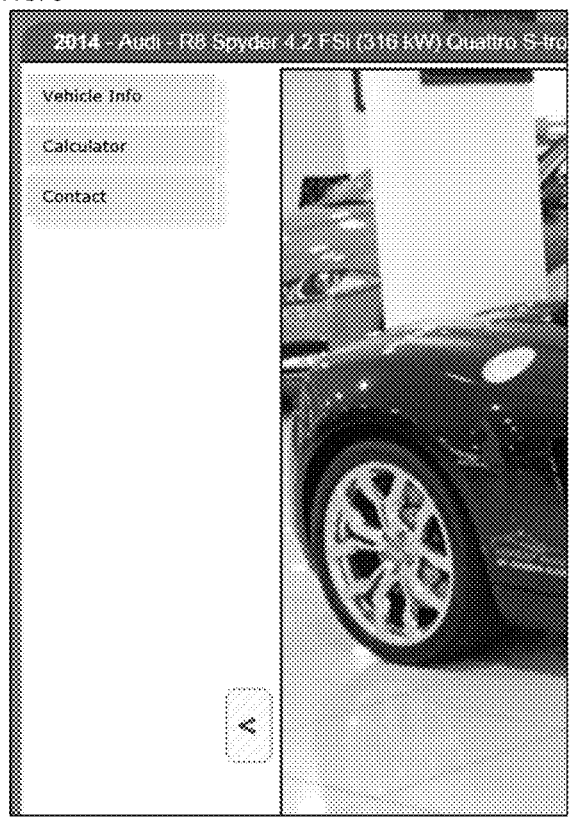
FIG. 8 shows detail of FIG. 7.
Figure 9:
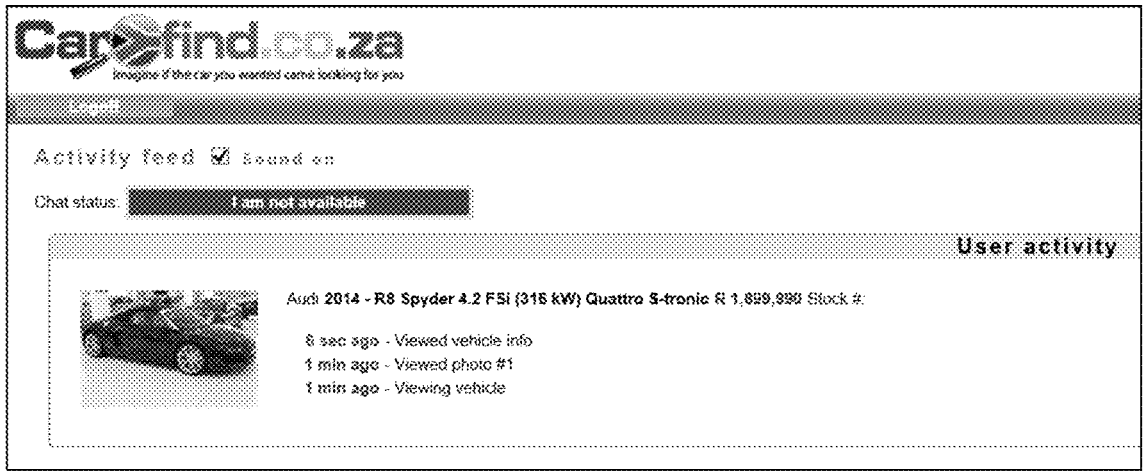
FIGS. 9 and 10 show customer activity as shown to seller.
Figure 10:
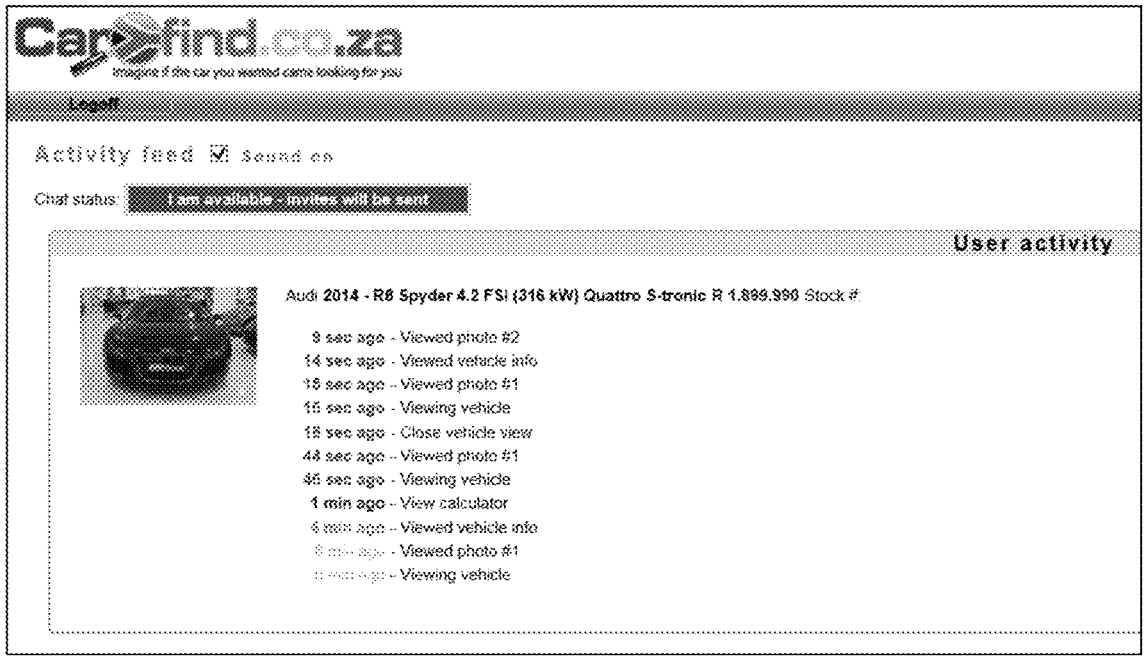
Figure 11:
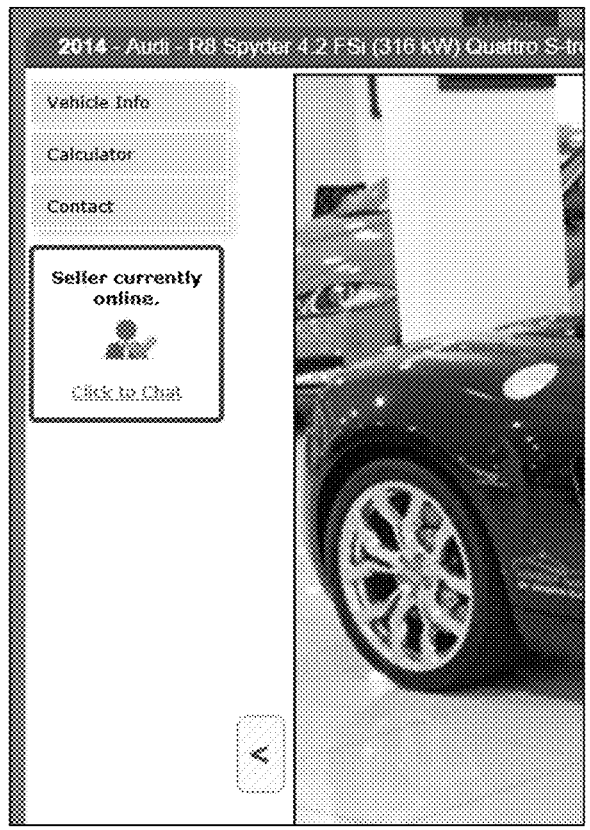
FIG. 11 shows a screen shot of customer interface when seller indicates he is available to chat.
Figure 12:
FIGS. 12-21 show screen shots of customer exercising option to chat and establishing a chat session.
Figure 13:
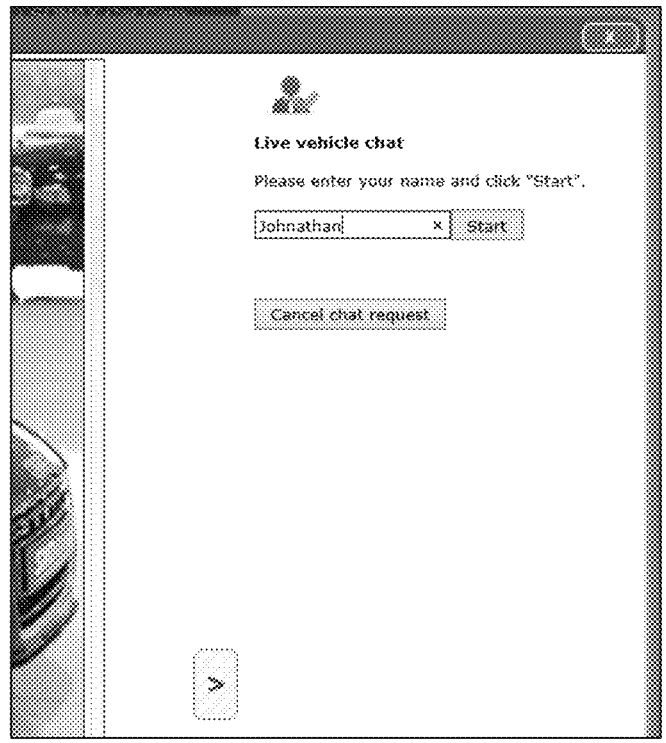
Figure 14:
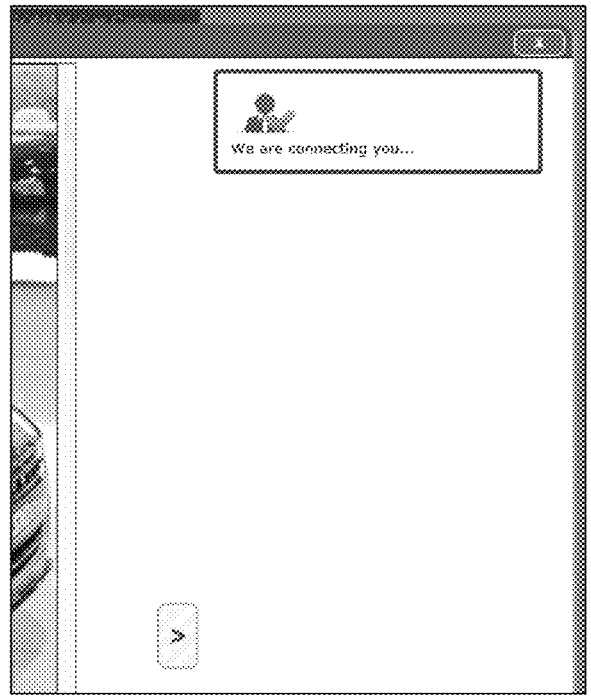
Figure 15:
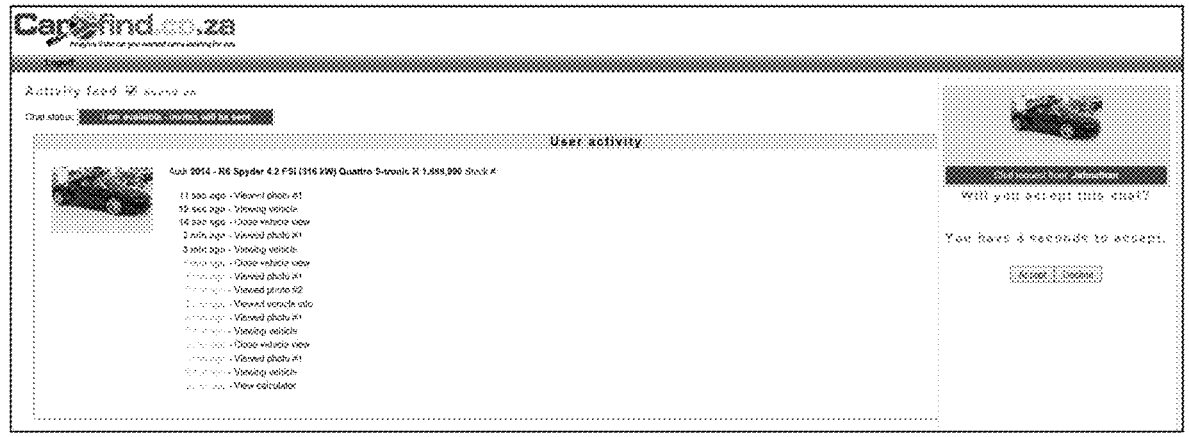
Figure 16:
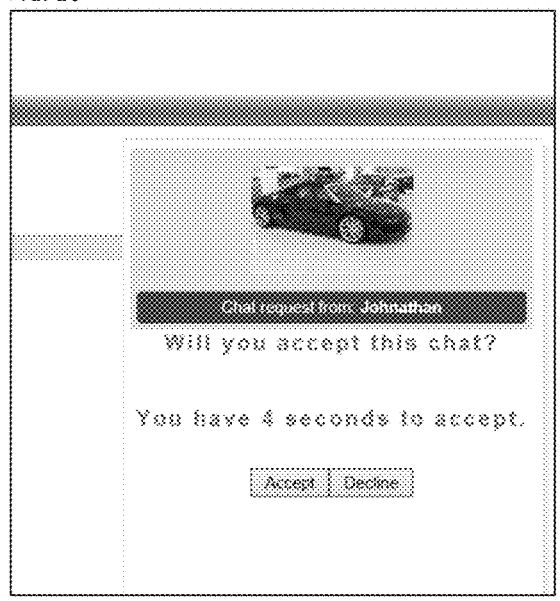
Figure 17:
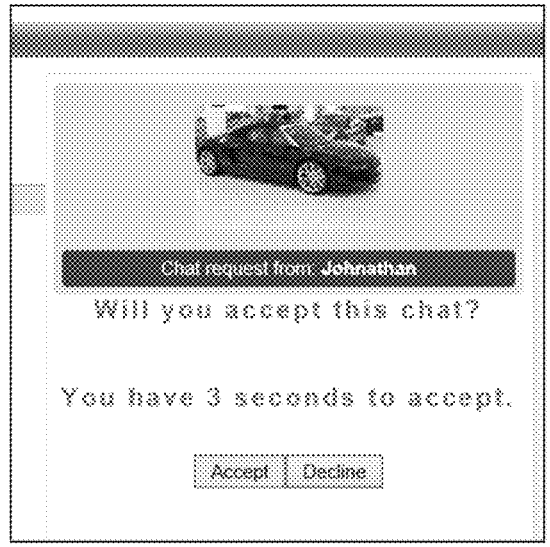
Figure 18:
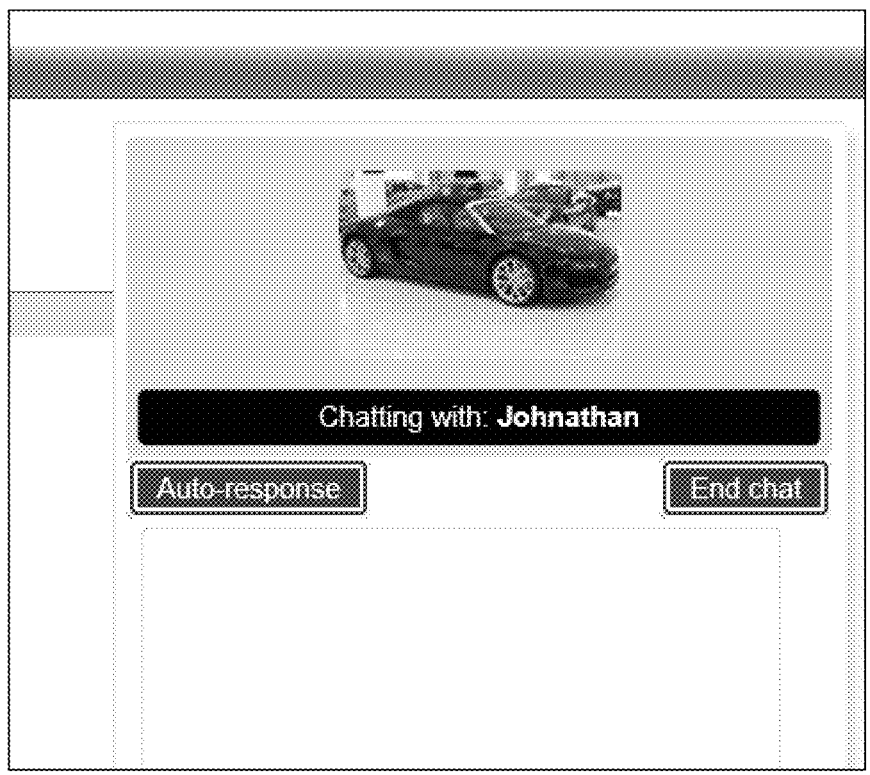
Figure 19:
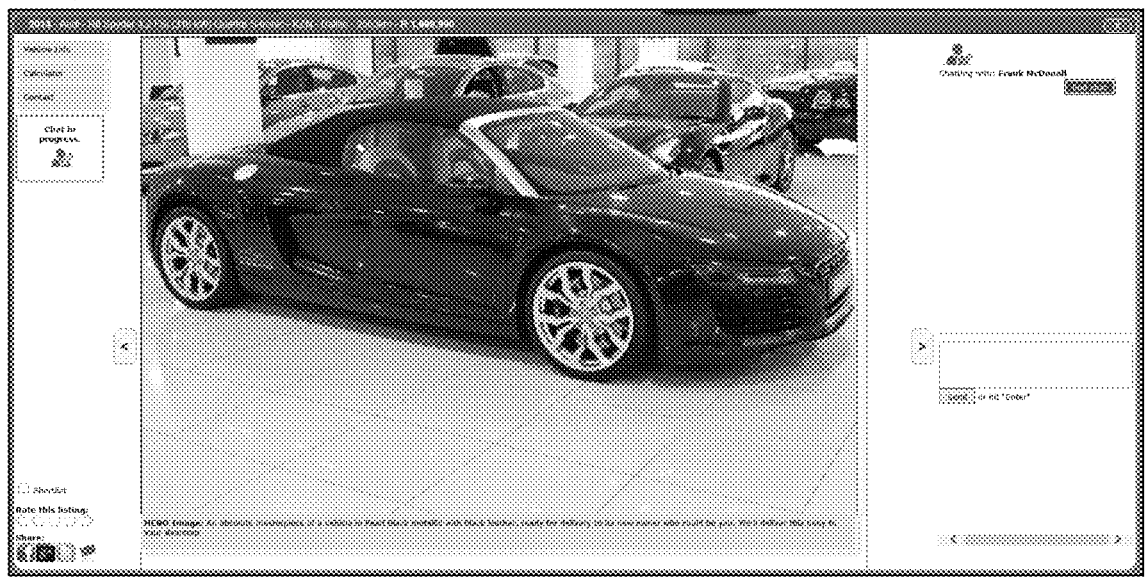
Figure 20:
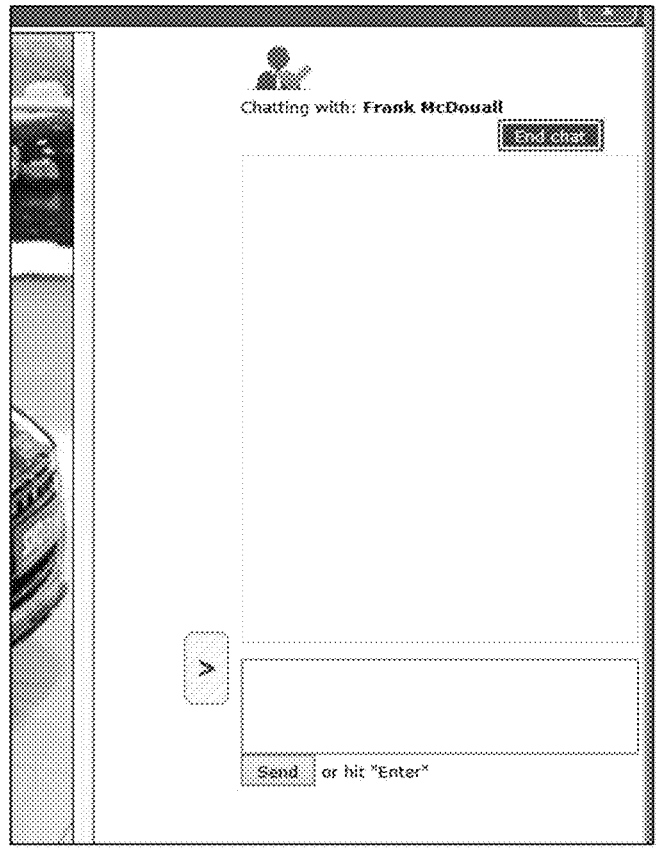
Figure 21:
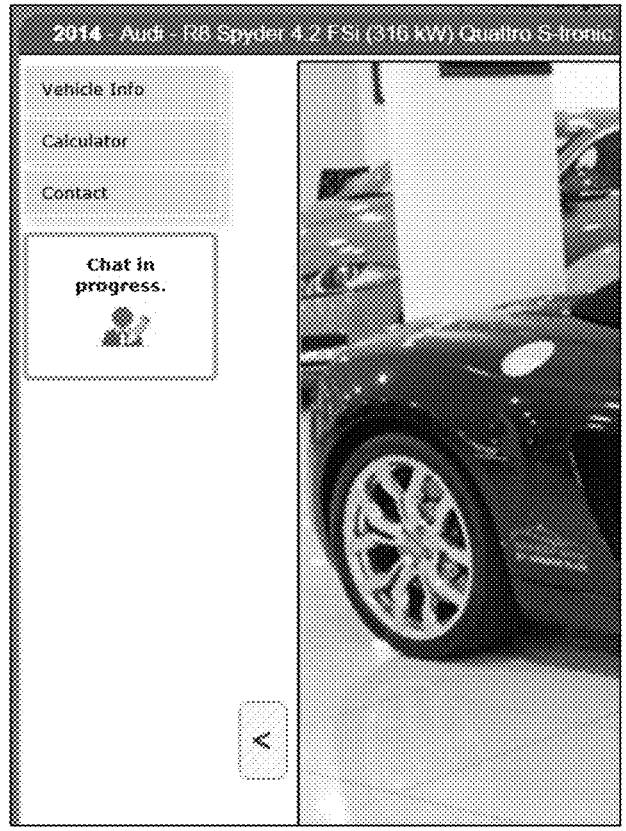
Figure 22:
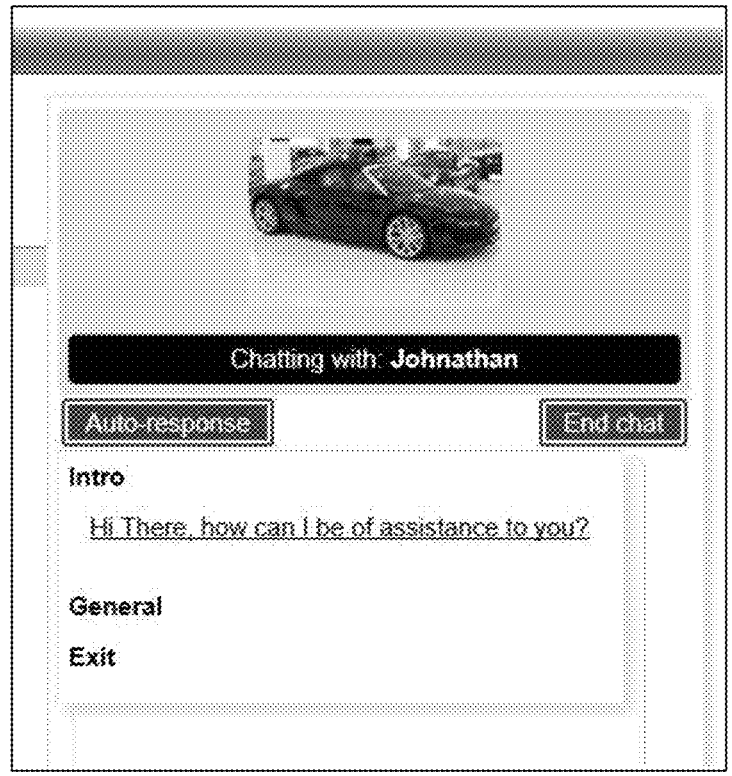
FIGS. 22-33 show a screen shot of a chat in progress.
Figure 23:
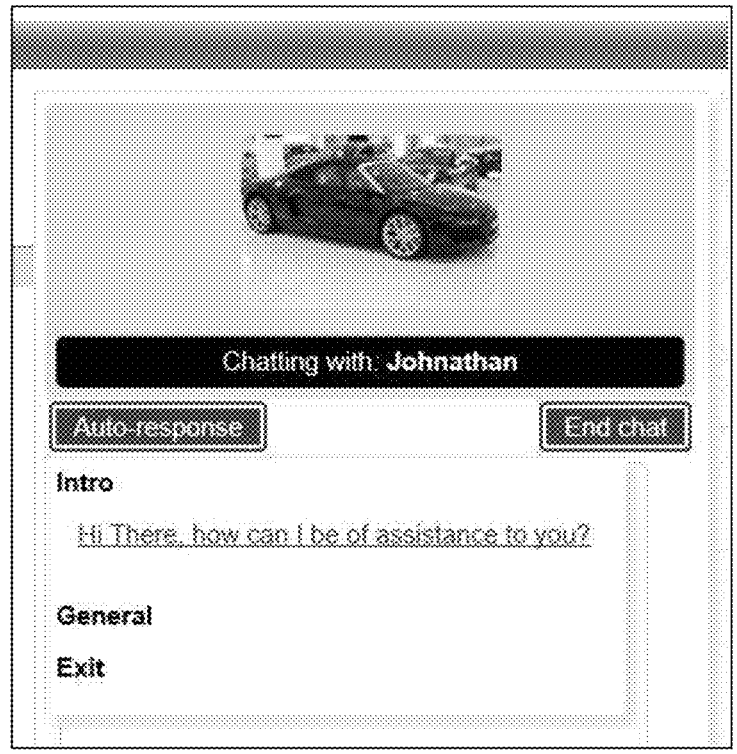
Figure 24:
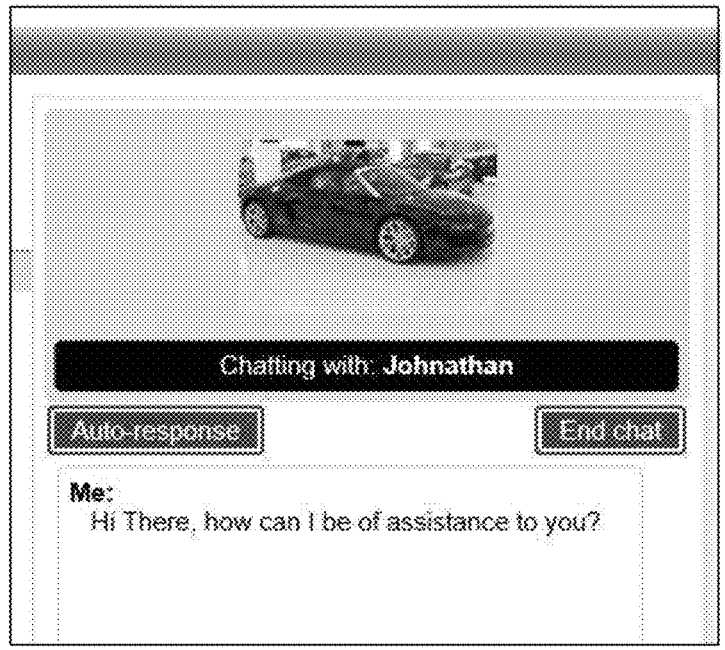
Figure 25:
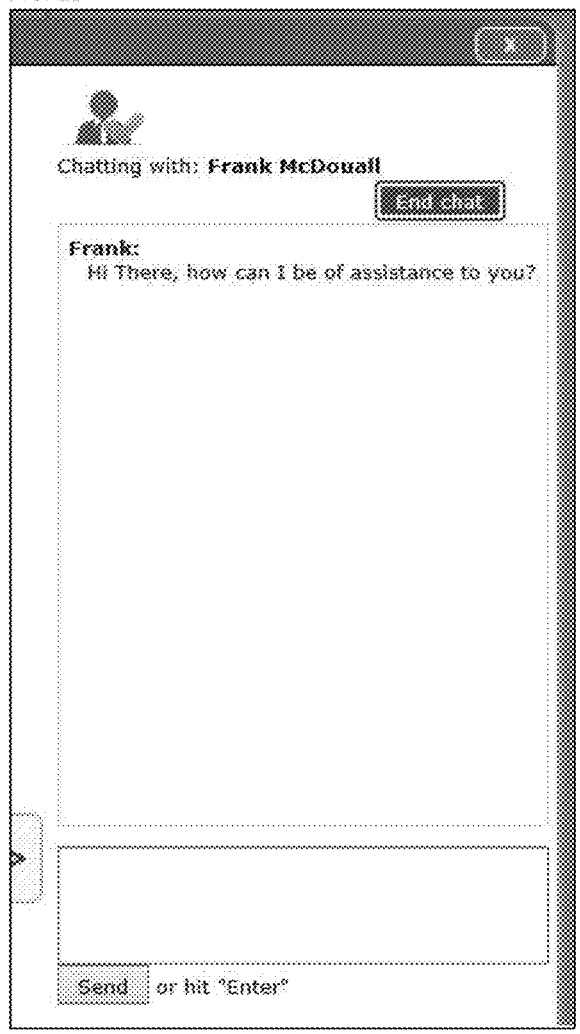
Figure 26:
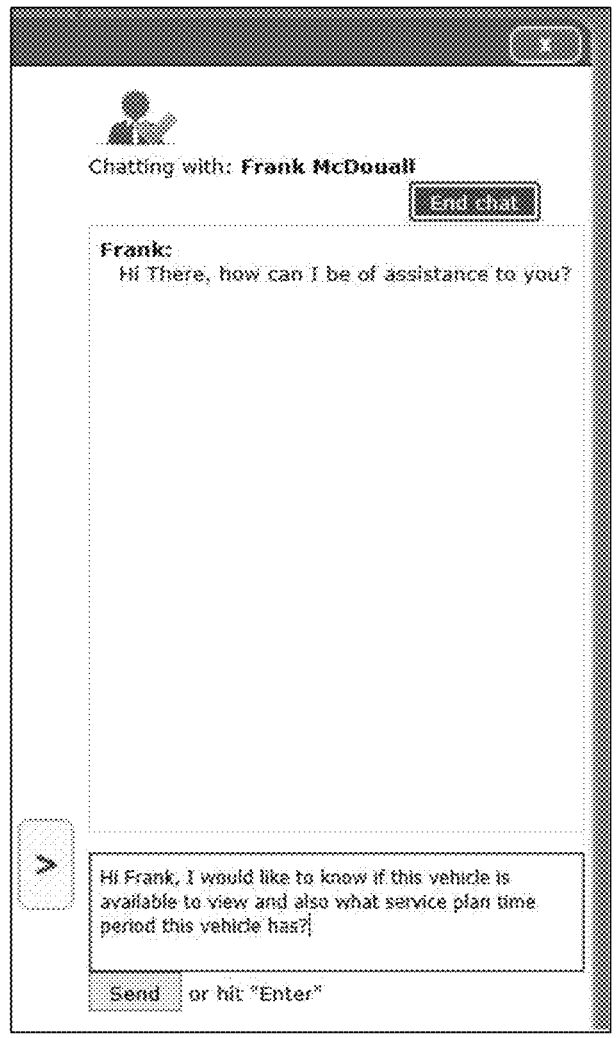
Figure 27:
Figure 28:
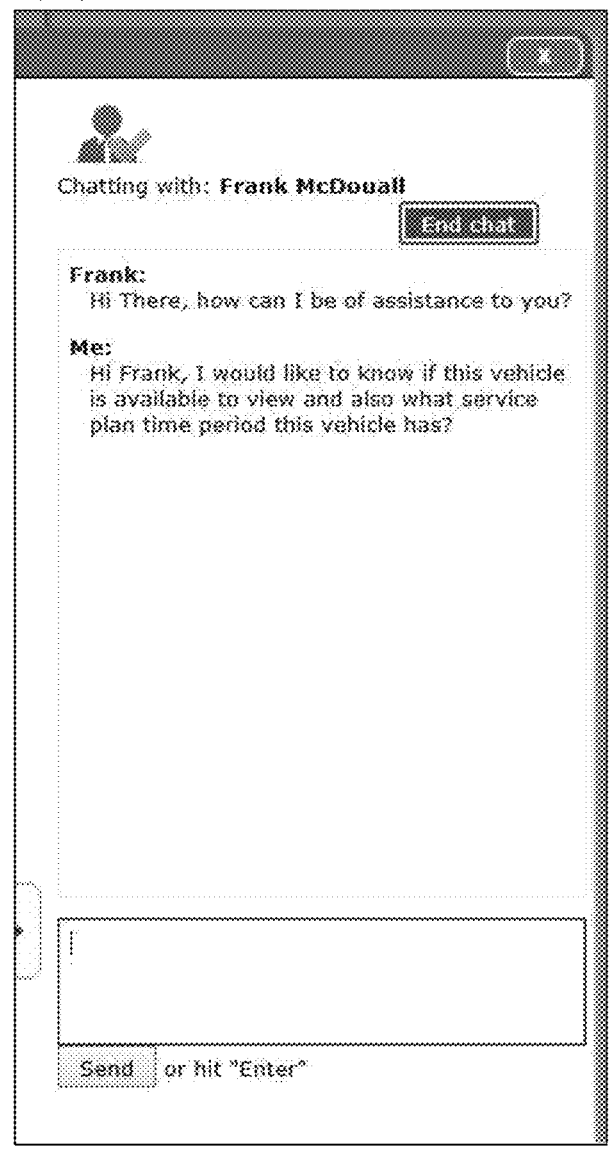
Figure 29:
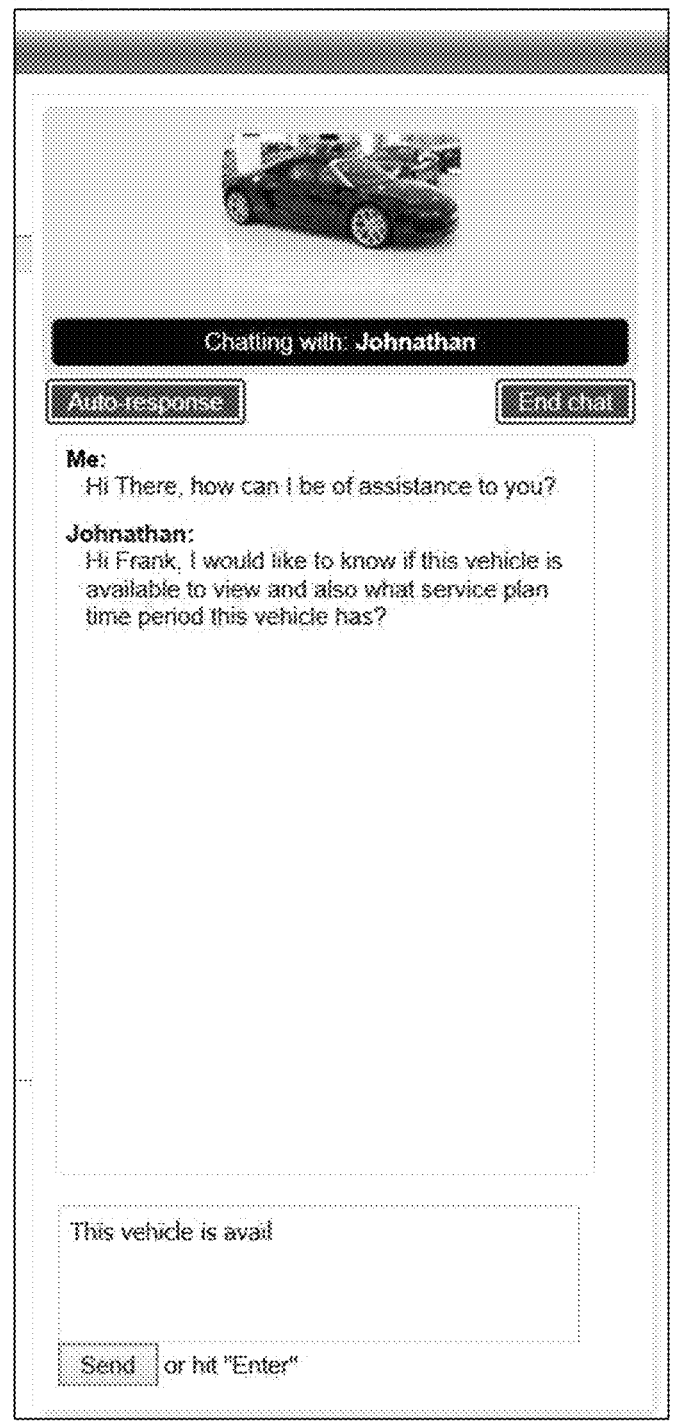
Figure 30:
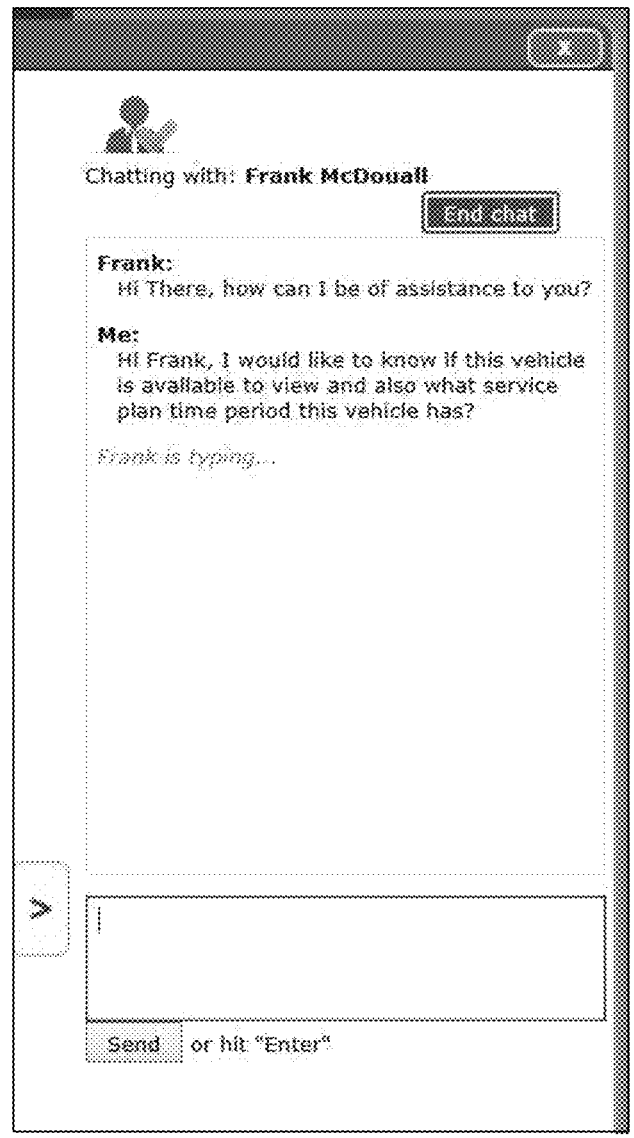
Figure 31:
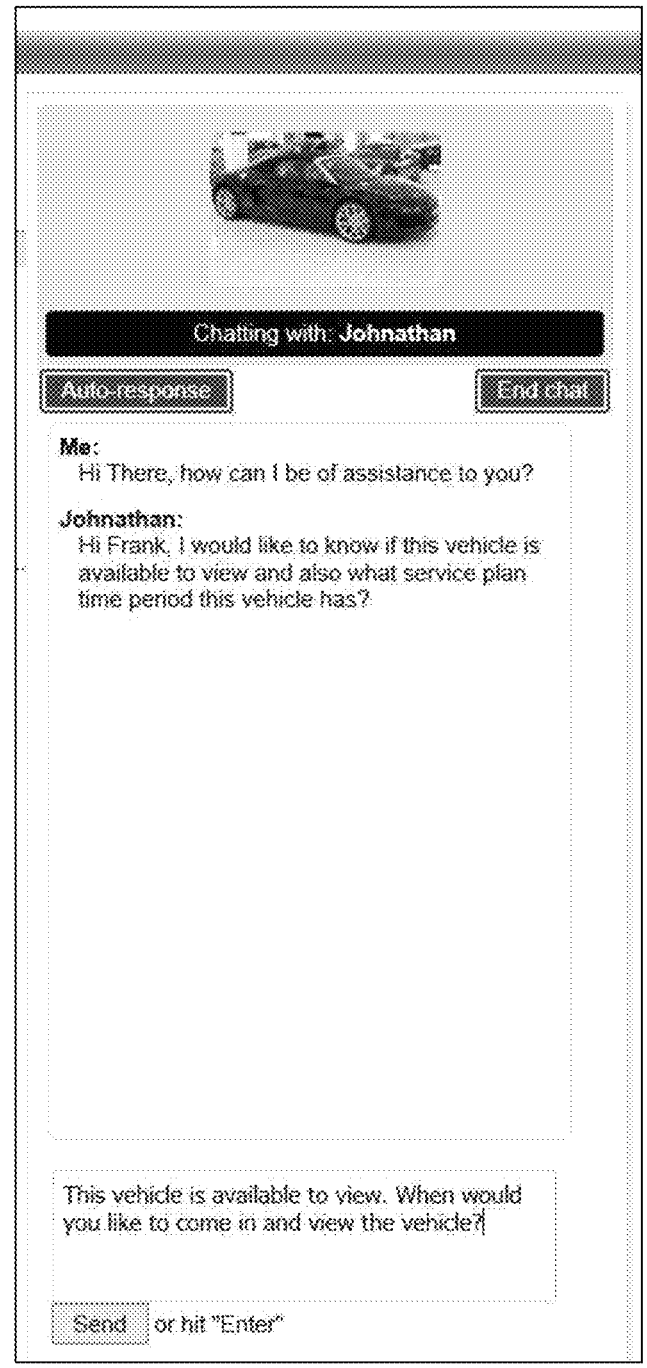
Figure 32:
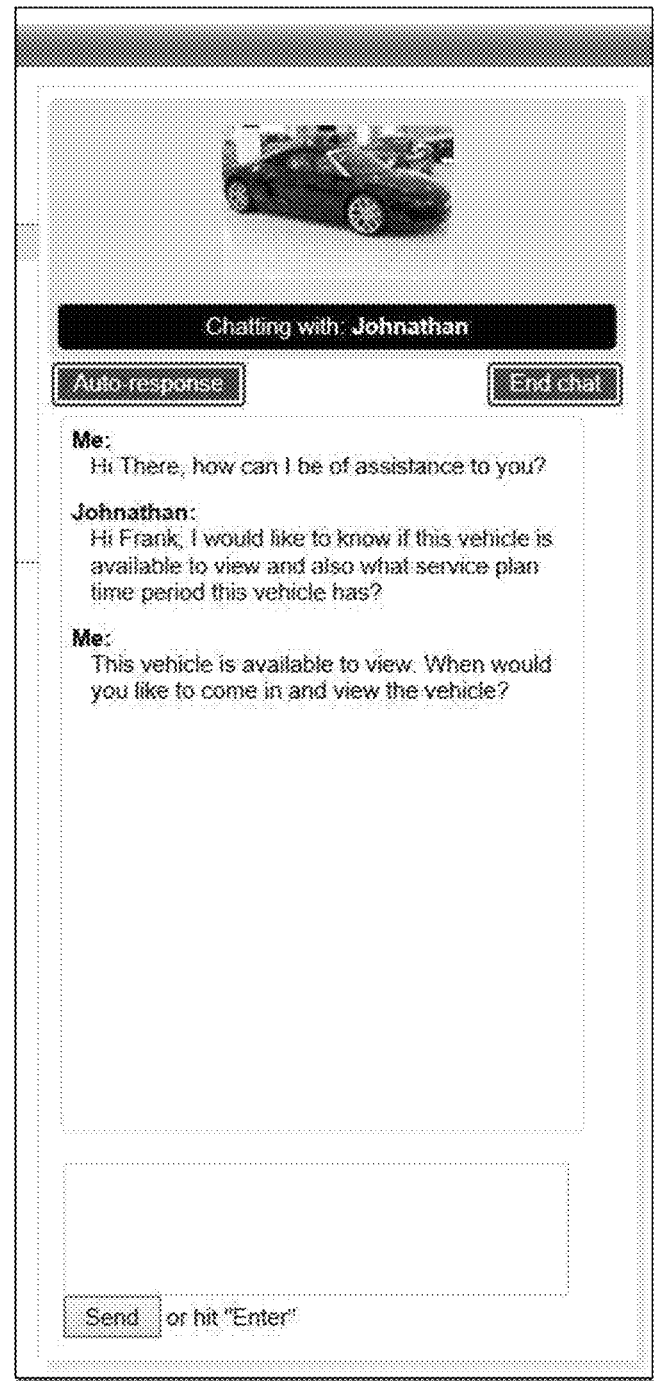
Figure 33:
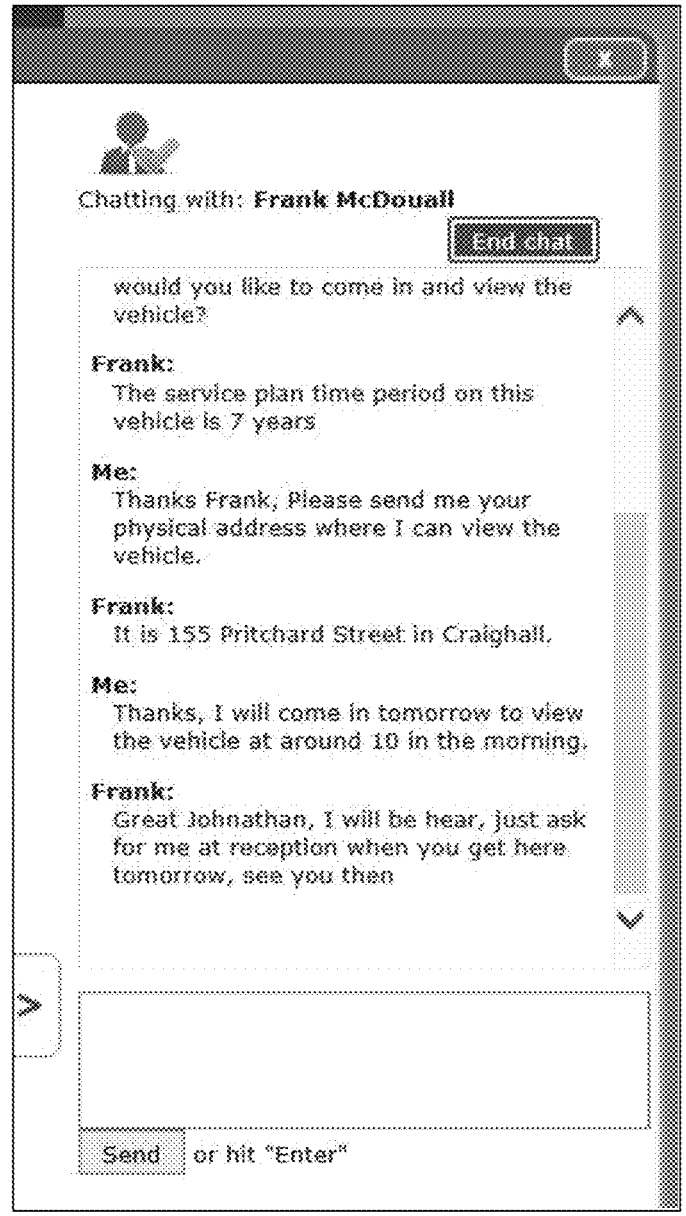
Figure 35:
Figure 36:
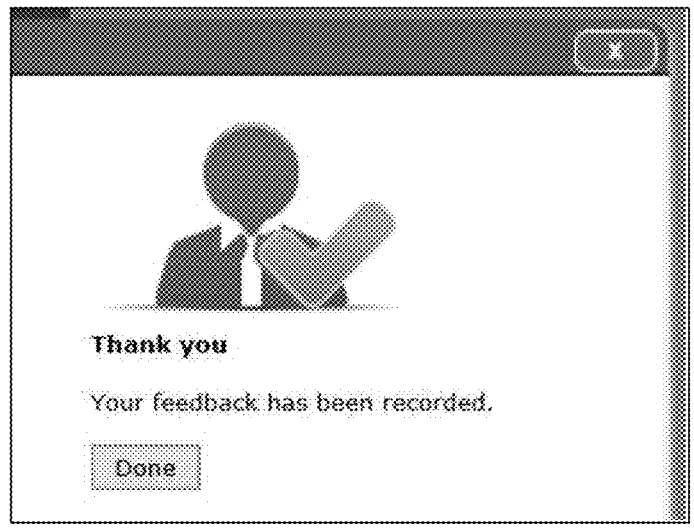
Figure 37:
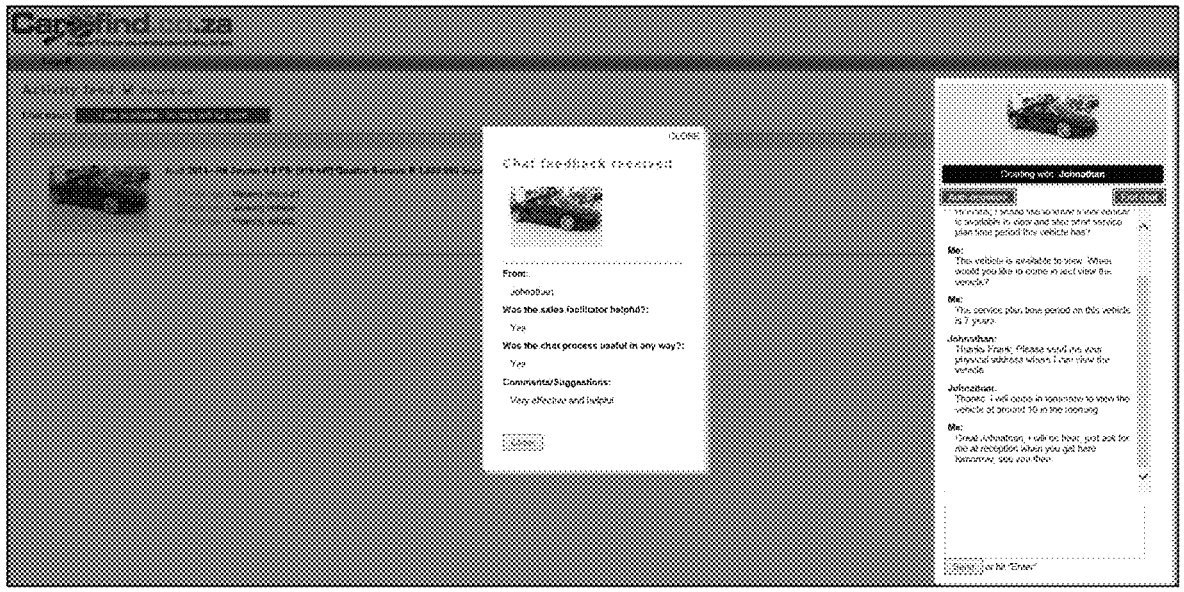
FIGS. 37-38 show feedback from the customer.
Figure 38:
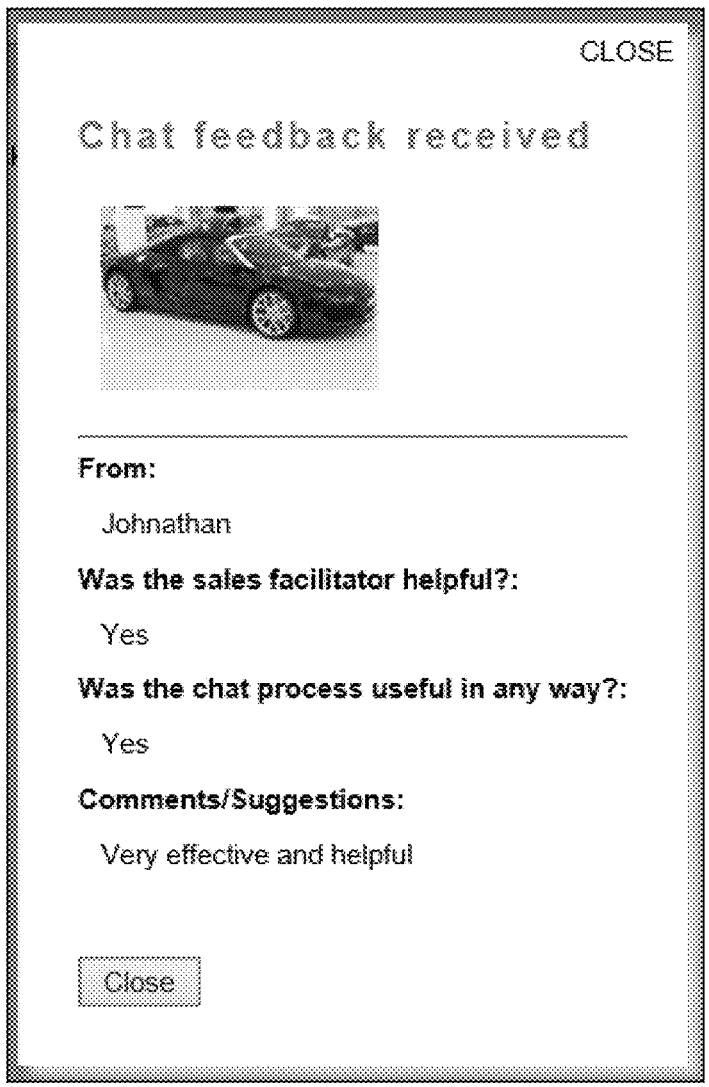
Figures 42, 43:

The marketplace website being a vehicle marketplace in this example includes a website, which is configured to display vehicles together with information regarding the respective vehicles, which can be searched, filtered and viewed by a potential customer. The website monitors the online status of seller of the particular product and potential customer activity for a particular product on a real time basis and in this case when the potential customers selects "Technical Specs" this customer activity is displayed live to the seller via the seller's portal page by the program and triggered by the fact that the potential customer has engaged with the seller's advertised product. It can be presumed that the potential customer is interested in the seller's product, and this presents an opportunity for the seller to activate the interactive chat opportunity to the potential customer, provided the seller is currently online, as well as the potential customer and the potential customer is currently browsing the seller's product page. The potential customer can then elect to chat with the seller and the seller and potential customer can then engage in a live chat. The website further provides the means for a customer to transact on the website by contacting the seller by other means after the chat, should it be necessary.

The invention is now described by way of examples with reference to the accompanying screen shots.

Vehicle Market Place

Screen shots 1 to 3 indicate that different sellers can have access to different product sets, whilst still sharing a common product set as well. This now means that the seller is set up to be able to interact with customers via the chat mechanism for products assigned to the trading entities listed in the above screen clips for each selling user account that has been set up.

Screen shots 4 and 5 show the logging in screens for the seller. Note the status bar, the seller is currently offline for the chat service in respect of the customer's perspective, albeit that the seller is online.

Screen shot 6 shows customer then coming onto car market place who filters through the products to get to specific vehicles that customer is interested in.

Screen shot 7 shows customer selecting a specific vehicle that interests customer out of results displayed to engage further with selected vehicle of choice.

Screen shot 8 shows a screen clip highlighting a specific area of the above vehicle showing detail.

Screen shot 9 shows then monitoring the customer activity recording and reporting page for any customer activity that would be recorded and logged, indicating customer interaction with seller's product.

Screen shot 10 shows that as soon as there is customer activity indicated, seller can then click the chat status bar to trigger the chat invite to the customer.

Screen shot 11 shows that once the seller has clicked on the red status bar "I am not available" button, which changes to green after being clicked, stating "Seller currently online" The customer then has the option to take up the seller's personal invitation to chat to the seller, should the customer feel the need to, by clicking on the "Click to Chat" link.

Screen shot 12 shows that the customer exercised his option to chat with seller and clicked on the "Click to Chat" link. The following appears on the right hand side of the customer's vehicle detail page. To respond to the seller's chat invitation, the customer needs to introduce himself to seller, buy entering his name.

Screen shot 13 shows the customer entering their name and clicking "Start" to activate the seller's chat invitation and Screen shot 14 shows what follows on the customers screen.

Screen shot 15 shows what appears on the seller's screen when the "Start" button is clicked; indicating that the customer has accepted the seller's initiated invitation to chat. The seller now has limited time in seconds to acknowledge and accept the customer's RSVP to the seller's chat invitation, Screen shots 16 and 17.

Screen shot 18 shows the seller's screen and Screenshot 19 shows the customers screen, when the seller clicked "Accept".

Screen shot 20 and 21 shows two screen clips to indicate specific areas of the customer's page in more detail, with the first being the chat window that is now open. It is also important to note that the seller's availability status has changed from being "available" to chat to indicate that the seller is currently engaged in a chat. This icon also appears on all open vehicle detail pages that other potential customers could be engaging with, unless there is a second available seller that has logged in to the system and made themselves available to chat (the chat system manages and co-ordinates the availability, queuing and connecting of multiple sellers that are currently available online that have sent out chat invitations to all potential customers.

Screen shot 22 shows the seller's page and for an efficient and effective chat service, the system has "Auto-response" options that the seller can use. For the seller to access these customised options, the seller would "mouse over" the green "Auto-response" button, which would bring up the options available to use.

Screen shot 23 shows that the seller clicked the "Intro" option "Hi There, how can I be of assistance to you?" with Screen shot ≥showing what appears in the seller's chat window.

Screen shot 25 shows what happens then on the customers screen.

Screen shot 26 shows the customer responding to the seller by typing in the question, in the relevant typing field, that the customer would have (this would have been the cause as to why the customer took up the seller's initiated invitation to chat). Once the customer has finished typing the question, they would click on the "Send" button to post their question for the seller, while the customer is typing, the seller's screen looks like Screen shot 27 and the customer's screen as shown in Screen shot 28 after "Send" button was clicked. Screen shot 29 shows the seller's screen.

The seller would then respond, Screen shot 29, and Screen shot 30 shows the seller's screen while the seller is typing and Screen shot 31 shows the seller's screen and 32 the customer's screen when "send" was clicked.

Screen shot 33 is seller's screen view with the tail end of the above posted response showing in the top of the customer's chat window, but also displaying the whole conversation.

Based on the above conversation transcript, it would be logical to assume that the customer and seller conversation has concluded and either the customer or seller could end the chat, the following screen appears on the customer screen as shown in Screen shot 34. The customer has the option to request a copy of the transcript and also to review the chat experience, see Screen shot 35. The transcript can be seen in screenshot 44.

When the customer clicks the "Submit" button, the customers screen appears as shown in Screen shot 36 and the customer would then click the "Done" button for the Vehicle Detail Page to return to its original form prior to accepting the Seller's chat invitation.

At the same time the Seller's screen appears as shown in Screen shot 37 with a focus on the customer's feedback, Screen shot 38. The seller can now click "Close" to finish the chat. A copy of the transcript is emailed to the customer, so that the customer can have a record of the conversation held as there could well be either terms of negotiation or useful information within this conversation.

Residential Property Market Place

Screen shots 39 and 40 shows the market place, in accordance with the invention, for use of listing residential properties Financial Institution Market Place Screen shots 41 and 42 shows a person looking to possible apply for a home loan. By clicking "next" brings up a screen, showing the next fields to use in the calculator, but also posting critical financial amount information as well as allowing a trigger for the Financial Consultant to invite the user to chat about raising a home loan for R 1,000,000.00.

TABLE 1

Date Range: 1 Nov.-31 Nov. 2014
Dealership Name ABC Car Sales

| Vehicle Name | Stock Number | Total Chat Opportunities | Taken Chat Opportunities | Lost Chat Opportunities - Offline | Lost Chat Opportunities - Busy | Lost Chat Opportunities - Did not accept buyers response |
|---|---|---|---|---|---|---|
| Dealership Representative | Frank McDewell | | | | | |
| R8 Spyder 4.2 FSi (316 kW) Quattro S-tronic | 123xyz | 27 | 11 | 10 | 2 | 4 |
| Polo Plays 1.4 Manual | 2784jfr4 | 38 | 14 | 11 | 6 | 7 |
| BMW 316i Steptronic | 764thy8 | 18 | 8 | 6 | 1 | 3 |
| Sub Total | | 83 | 33 | 27 | 9 | 14 |
| Dealership Representative | Michael de Charmey | | | | | |
| R8 Spyder 4.2 FSi (316 kW) Quattro S-tronic | 123xyz | 22 | 12 | 5 | 3 | 2 |
| Polo Plays 1.4 Manual | 2784jfr4 | 31 | 14 | 11 | 2 | 4 |
| BMW 316i Streptronic | 764thy8 | 26 | 13 | 6 | 4 | 3 |
| Sub Total | | 79 | 39 | 22 | 9 | 9 |
| Dealership Grand Total | | 162 | 72 | 49 | 18 | 23 |

Table 1 shows and example of typical recorded data which is formatted into a report from which performance can be analysed.

It shall be understood that the examples are provided for illustrating the invention further and to assist a person skilled in the art with understanding the invention and are not meant to be construed as unduly limiting the reasonable scope of the invention.

The invention claimed is:

1. A computer server configured to host a web based marketplace that comprises a website, the web based marketplace configured to:
   display products of more than one seller together with information regarding the respective products, which can be searched and viewed by a potential customer;
   monitor an activity of the potential customer when viewing a particular product on the website;
   monitor an online status of the seller of the particular product;
   in response to determining that the seller is online based on the monitored online status, list and display in real time the activity by the potential customer to the seller regarding a product or products listed by the seller in conjunction with all the other products listed by other sellers;

display, in response to determining that the seller is online, one or more links on the website to the potential customer indicating that the seller is available for a live online chat utilizing a live online chat mechanism via an online portal, where the one or more links are displayed on the website while the potential customer is viewing the product or products listed by the seller of the more than one seller on the web based marketplace, wherein the one or more links are selectable by the potential customer to initiate the live online chat; and initiate the live online chat between the potential costumer and the seller utilizing the live online chat mechanism via the online portal in response to the potential customer selecting the one or more links displayed on the website.

2. The computer server configured to host the web based marketplace as claimed in claim 1, wherein the online portal is an application on a personal computer, a laptop, or a handheld device, wherein the online portal is connectable to the internet to allow the seller to communicate via the live online chat with the potential customer; and the online portal is configured to allow the seller to upload particulars of the particular product.

3. The computer server configured to host the web based marketplace as claimed in claim 1, wherein forms, documents and digital photos may also be uploaded via the online portal and during the live online chat.

4. The computer server configured to host the web based marketplace as claimed in claim 1, wherein the live online chat mechanism is automatically activated based on the seller indicating that the seller is available for the live online chat and the website displaying to the potential customer that the seller is online and available to communicate.

5. The computer server configured to host the web based marketplace as claimed in claim 1, wherein the seller is configured to have a plurality of representatives allocated to the particular product, the web based marketplace further comprising a queuing system that is provided to use a second representative of the plurality of representatives should a first representative of the plurality of representatives not be available to engage with the potential customer via the live online chat.

6. The computer server configured to host the web based marketplace as claimed in claim 1, wherein the web based marketplace is configured to keep a log of website activity and is further configured to compile an activity report.

7. The computer server configured to host the web based marketplace as claimed in claim 6, wherein the activity report comprises a calculation report showing a calculation of revenue due to a host of the web based marketplace.

8. The computer server configured to host the web based marketplace as claimed in claim 1, wherein the web based marketplace is configured to facilitate activating one or more additional portals by the seller for communication with a second device, wherein the second portal operates in parallel with the first portal.

9. A system for providing a web based marketplace, the system comprising a computer server configured to host a website, the system configured to:

display products together with information regarding the products, the products configured to be searched and viewed by a potential customer;

monitor customer activity of the potential customer, the customer activity including viewing a particular product;

monitor an online status of a seller of the particular product;

in response to determine that the seller is online based on the monitored online status, list and display in real time the customer activity by the potential customer to the seller regarding a product or products listed by the seller; and display, in response to determining that the seller is online, one or more links on the website to the potential customer indicating that the seller is available for a live online chat utilizing a live online chat mechanism via an online portal, where the one or more links are displayed on the website while the potential customer is viewing the product or the products listed by the seller of the more than one seller on the web based marketplace, wherein the one or more links are selectable by the potential customer to initiate the live online chat.

10. The system as claimed in claim 9 further comprising a software application loaded onto a personal computer, a laptop, and/or a handheld device, wherein the software application provides a seller with an interface to communicate live with the potential customer.

11. The computer server configured to host the web based marketplace as claimed in claim 2, wherein forms, documents and digital photos may also be uploaded via the online portal and during the live online chat.

12. The computer server configured to host the web based marketplace as claimed in claim 2, wherein the live online chat mechanism is automatically activated based on the seller indicating that the seller is available for the live online chat and the website displaying to the potential customer that the seller is online and available to communicate.

13. The computer server configured to host the web based marketplace as claimed in claim 3, wherein the live online chat mechanism is automatically activated based on the seller indicating that the seller is available for the live online chat and the website displaying to the potential customer that the seller is online and available to communicate.

14. The computer server configured to host the web based marketplace as claimed in claim 2, wherein the seller is configured to have a plurality of representatives allocated to the particular product, the web based marketplace further comprising a queuing system that is provided to use a second representative of the plurality of representatives should a first representative of the plurality of representatives not be available to engage with the potential customer.

15. The computer server configured to host the web based marketplace as claimed in claim 3, wherein the seller is configured to have a plurality of representatives allocated to the particular product, the web based marketplace further comprising a queuing system that is provided to use a second representative of the plurality of representatives should a first representative of the plurality of representatives not be available to engage with the potential customer.

16. The computer server configured to host the web based marketplace as claimed in claim 4, wherein the seller is configured to have a plurality of representatives allocated to the particular product, the web based marketplace further comprising a queuing system that is provided to use a second representative of the plurality of representatives should a first representative of the plurality of representatives not be available to engage with the potential customer.

17. The computer server configured to host the web based marketplace as claimed in claim 2, wherein the web based marketplace is configured to keep a log of website activity and is further configured to compile an activity report.

18. The computer server configured to host the web based marketplace as claimed in claim 3, wherein the web based marketplace is configured to keep a log of website activity and is further configured to compile an activity report.

19. The computer server configured to host the web based marketplace as claimed in claim 4, wherein the web based marketplace is configured to keep a log of website activity and is further configured to compile an activity report.

20. The computer server configured to host the web based marketplace as claimed in claim 5, wherein the web based marketplace is configured to keep a log of website activity and is further configured to compile an activity report.

* * * * *

UNITED STATES PATENT AND TRADEMARK OFFICE
CERTIFICATE OF CORRECTION

PATENT NO. : 10,521,840 B2
APPLICATION NO. : 15/102960
DATED : December 31, 2019
INVENTOR(S) : Francis John Stephen McDouall It is certified that error appears in the above-identified patent and that said Letters Patent is hereby corrected as shown below:

On the Title Page

Item (73), should read:
(73) Assignee: LOR TECHNOLOGIES (PTY) LTD.
Edenvale (ZA)

Signed and Sealed this
Ninth Day of June, 2020

Andrei Iancu
*Director of the United States Patent and Trademark Office*